United States Patent
Mitchell et al.

(10) Patent No.: US 8,434,618 B2
(45) Date of Patent: May 7, 2013

(54) SHIPPING CONTAINER

(75) Inventors: Jeffrey W. Mitchell, Lexington, KY (US); Todd T. Turner, Corydon, IN (US)

(73) Assignee: Macro Plastics, Inc., Fairfield, CA (US)

( * ) Notice: Subject to any disclaimer, the term of this patent is extended or adjusted under 35 U.S.C. 154(b) by 222 days.

(21) Appl. No.: 13/002,086

(22) PCT Filed: Jul. 6, 2009

(86) PCT No.: PCT/US2009/049665
§ 371 (c)(1),
(2), (4) Date: Dec. 30, 2010

(87) PCT Pub. No.: WO2010/003145
PCT Pub. Date: Jan. 7, 2010

(65) Prior Publication Data
US 2011/0108549 A1    May 12, 2011

Related U.S. Application Data

(60) Provisional application No. 61/077,875, filed on Jul. 3, 2008.

(51) Int. Cl.
B65D 19/00    (2006.01)
B65D 19/12    (2006.01)
B65D 8/14    (2006.01)

(52) U.S. Cl.
USPC ............ 206/386; 108/56.3; 108/57.25; 220/7

(58) Field of Classification Search ............ 206/386, 206/599, 600; 220/1.5, 4.28, 4.32, 6, 7, 615, 220/630; 108/51.1, 56.3, 56.1, 57.25, 57.26
See application file for complete search history.

(56) References Cited

U.S. PATENT DOCUMENTS

| | | | |
|---|---|---|---|
| 4,186,841 A | | 2/1980 | Buckley et al. |
| 4,775,068 A | * | 10/1988 | Reiland et al. ............ 220/6 |
| 4,799,433 A | | 1/1989 | Luft |
| 4,917,255 A | * | 4/1990 | Foy et al. ............ 220/6 |
| 5,069,338 A | | 12/1991 | Grigsby |
| 5,105,947 A | | 4/1992 | Wise |
| 5,110,000 A | | 5/1992 | Nichols |
| 5,289,933 A | | 3/1994 | Streich et al. |
| 5,449,082 A | | 9/1995 | Reynard |
| 5,483,899 A | | 1/1996 | Christie |
| 5,497,709 A | | 3/1996 | Gonzalez et al. |
| 5,582,113 A | | 12/1996 | Langenbeck |
| 5,595,305 A | | 1/1997 | Hart |
| 5,722,328 A | | 3/1998 | Darby |
| 5,722,555 A | | 3/1998 | Polzl |

(Continued)

FOREIGN PATENT DOCUMENTS
WO    WO/01/96214 A1    12/2001

*Primary Examiner* — Bryon Gehman
(74) *Attorney, Agent, or Firm* — Wyatt, Tarrant & Combs, LLP; Matthew A. Williams

(57) ABSTRACT

A reusable shipping container adapted to resist damage to the feet of the container and to allow the fork straps to be replaced if the fork straps or the feet are damage. The container can also easily be adapted to accommodate the use of pallet jacks without reducing the capacity of the container or increasing the weight of the container. The container is also adapted to easily receive dunnage required to protect the material being shipped in the container.

26 Claims, 16 Drawing Sheets

U.S. PATENT DOCUMENTS

| | | | |
|---|---|---|---|
| 5,868,080 | A | 2/1999 | Wyler et al. |
| 5,887,529 | A | 3/1999 | John et al. |
| 5,918,744 | A | 7/1999 | Bringard et al. |
| 5,941,179 | A | 8/1999 | Herring |
| 6,024,223 | A | 2/2000 | Ritter |
| 6,109,190 | A | 8/2000 | Hale et al. |
| 6,250,234 | B1 | 6/2001 | Apps |
| 6,283,044 | B1 | 9/2001 | Apps |
| 6,357,366 | B1 | 3/2002 | Frankenburg |
| 6,389,990 | B1 | 5/2002 | Apps |
| 6,564,725 | B2 | 5/2003 | Hale |
| 6,622,641 | B2 | 9/2003 | Smyers |
| 6,622,642 | B2 * | 9/2003 | Ohanesian ................. 108/57.25 |
| 6,776,300 | B2 | 8/2004 | Walsh et al. |
| 6,832,562 | B2 | 12/2004 | Tabor et al. |
| 6,840,181 | B2 | 1/2005 | Smyers |
| 6,868,979 | B2 | 3/2005 | Rader |
| 6,886,475 | B2 | 5/2005 | Apps et al. |
| 6,962,115 | B2 | 11/2005 | Markling et al. |
| 6,976,437 | B2 | 12/2005 | Fisch et al. |
| 7,111,561 | B2 | 9/2006 | Kulbeth et al. |
| 7,165,499 | B2 | 1/2007 | Apps et al. |
| 7,258,232 | B2 | 8/2007 | Bradford et al. |
| 7,360,663 | B2 | 4/2008 | Vroon |
| 8,006,629 | B2 * | 8/2011 | Naidu ........................ 108/56.3 |
| 8,127,691 | B2 * | 3/2012 | Ingham .................... 108/57.25 |
| 2002/0148859 | A1 | 10/2002 | Pigott et al. |
| 2004/0011798 | A1 | 1/2004 | Dubois et al. |
| 2005/0121448 | A1 | 6/2005 | Rader |
| 2005/0126952 | A1 | 6/2005 | Kaltz, Jr. et al. |
| 2005/0155971 | A1 | 7/2005 | Vroon |
| 2006/0081490 | A1 | 4/2006 | Bradford et al. |
| 2006/0120820 | A1 | 6/2006 | Nyeboer |
| 2006/0169185 | A1 | 8/2006 | Williams, Jr. |
| 2006/0254476 | A1 | 11/2006 | MacDonald et al. |
| 2007/0062420 | A1 | 3/2007 | Apps et al. |
| 2007/0108203 | A1 | 5/2007 | Vroon |
| 2007/0251857 | A1 | 11/2007 | Watanabe |
| 2007/0257032 | A1 | 11/2007 | Vroon |
| 2008/0017081 | A1 | 1/2008 | Baltz |

* cited by examiner

SHIPPING CONTAINER

CROSS-REFERENCE TO RELATED APPLICATIONS

This is a U.S. national stage application of PCT/US09/49665 filed Jul. 7, 2009, which claims priority of U.S. Provisional Application No. 61/077,875, filed Jul. 3, 2008, which is hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention generally relates to shipping containers, and more specifically to reusable shipping containers that are designed to be moved via forks attached to a lift vehicle or by a pallet jack or similar apparatus.

2. General Background of the Invention

Various types of reusable containers have long been used in the field of material handling. These containers generally include a base that forms the bottom of the container, a forkstrap assembly that may or may not be integral to the base, and sidewalls extending upward from the base. The forkstrap assembly typically defines two pairs of parallel fork slots with the fork slots of each pair being perpendicular to the fork slots of the other pair. These fork slots traverse the bottom of the base and are designed to accept the forks of a forklift or similar device for moving the container. Typically, the bottom of each fork slot is perpendicularly traversed by a plurality of fork straps that prevent a container from tipping off of the forks of a lift when the container is lifted into the air.

These containers are typically moved around warehouses and put on trucks by forklifts. These forklifts drive at considerable speed and can be difficult to handle. As a result these shipping containers tend to incur significant damage to the fork strap and the feet. This damage occurs when the operator of a forklift poorly aligns the forks with the fork slots causing the fork to impact one or more of the feet with significant force. The tip of a fork can directly impact the exterior portion of the perimeter feet on the side facing the lift when the lift approaches the container. The fork can also directly impact an interior side of the feet of the container that are located on the opposite side of container, an interior side of the feet located on one of the sides of the container, or a side of the centrally located feet if the operator causes the forks to enter the fork slots at an angle. The feet of such containers also can experience damage when the operator of a lift uses the edges of the forks to slide a container sideways on the floor without lifting the container. And the sides of the feet are also subject to being sliced by the tips of the forks when the operator of a lift executes a quick turn when the forks are not clear of the container.

Often the damage inflicted by a fork truck can be catastrophic and can render the container unusable, sometimes breaking off large pieces of the base. When this occurs, one must either replace the entire base of the container at a significant cost or purchase a completely new container.

Another type of damage that is very common to these types of containers is that one or more fork straps will break due to abuse. The fork straps are on the container to act as a safety feature when containers are picked up by a fork lift. The fork straps keep the container from tipping off the end of the forks during transport. It is extremely important that the fork straps remain in proper working order. Many known designs include the fork straps that are an integral part of the base. Thus, when the fork strap breaks it is necessary to replace the entire base because it is not possible to replace or repair the strap, thereby causing the owner of the container considerable expense. Other known designs utilize separate fork straps or a separate fork strap assembly that is attached to the bottom of the feet or snap into the feet. The problem with this design is that if a foot is damaged, the fork straps, or fork strap assembly, can no longer be replaced.

Once one or more feet of a container sustain sufficient damage or one or more fork straps are broken, the container can be rendered unusable. Some container designs have addressed this by making the sidewalls of the container removable from the base that defines the bottom of the container and the fork straps such that the sides can be reused with a new base. In practice, however, the entire container is frequently scrapped because the cost of the labor involved in disassembling the damaged container and assembling the old sides to a new base outweighs the cost of a new container.

Some known designs provide some protection to the exterior sides of the feet on the perimeter of the container, but these designs do not address the full scope of the problem because no protection is provided for the other sides of the perimeter feet or the centrally located feet. In addition, the feet and the protection extend down from the base, meaning that there is no means of replacing a damaged foot. These designs also provide only a single layer of protection to the exterior side of the feet that is easily punctured by a direct hit from a fork.

Thus, what is needed is a container design where at least the external impact surface of the feet extends up from the fork straps and that provides multiple layers of impact protection to all sides of the feet, including the central, internal feet, and that further protects the mechanism for connecting the fork straps or forkstrap assembly to the base.

In many applications, the users of containers require a container that has fork straps running in only one direction in order to accommodate to the use of pallet jacks or similar devices that have wheels located at the tips of the fork that have to roll under the container. Such devices typically only lift the container a few inches off of the ground to allow it to be transported across the floor of a warehouse or some similar surface. In such cases, the fork straps make it difficult, if not impossible, to position the pallet jack under the base to lift the container. Known devices simply omit the fork straps in one direction or users cut off the fork straps in one direction. This results in the lessening of the capacity of the container due to the elimination of a plurality of fork straps that stiffen the container. In some cases, the base of the container will be reinforced with metal plates or other material to maintain the capacity of the container, but this increases the weight of the container and may reduce the number of containers that can be shipped in a single truck due to weight restrictions and will result in increased consumption of fuel. Such reinforcement is also costly because it adds additional material and labor to the cost of the container.

Thus, what is needed is a container design that can relocate the fork straps in one direction to accommodate the use of wheeled pallet jacks without lessening the capacity of the container without increasing the weight or cost of the container.

Another issue with known containers is the lack of a standard manner of handling dunnage. Frequently material shipped in such containers requires a great deal of dunnage to prevent the material from being damage. Examples include dividers to prevent painted metal parts from banging against each other damaging the paint or small plastic parts like twist off lids for soft drink bottles that require shelves throughout the container to prevent the weight of the lids from deforming those on the bottom. Known methods of addressing the dunnage problem include the use of disposable dunnage or expensive retrofitting of containers to accept reusable dunnage.

Thus, what is needed is a container design that provides for a standard method of attaching dunnage to the container that will allow the development of standard forms of reusable dunnage that is easily connectable to the container.

SUMMARY OF THE INVENTION

The present invention relates to reusable shipping containers and in particular to reusable containers that utilize a replaceable fork strap assembly where the exposed portion of the feet of the container is integral to the fork strap unit rather than the base of the container. The invention further relates to a container in which the fork straps in one direction can be formed at the upper portion of the feet to enable use of the container with a pallet jack without lessening the capacity of the container or adding additional weight and cost to the container to maintain the same capacity. The invention further relates to a container that is adapted to easily accept dunnage required for the protection and organization of material being shipped in the container.

BRIEF DESCRIPTION OF THE DRAWINGS

For a further understanding of the nature, objects, and advantages of the present invention, reference should be had to the following detailed description, read in conjunction with the following figures, wherein like reference numerals denote like elements and wherein.

DETAILED DESCRIPTION OF THE INVENTION

The present invention is a novel shipping container C that addresses the problems described above. In known containers, post-like "feet" extend downward from the base to provide a gap under the base to allow the forks of a fork truck to slide under the base. The fork strap is then either integrally formed between the feet in a known pattern or snapped into the feet. This results in the feet being exposed to direct hits from the forks of the fork truck, and when they are damaged, causing the owner of the container to either have to replace the entire base, including the base portion, or to scrap the container. Considering the cost of disassembling the sides of the container from the base, containers with damaged feet are more frequently scrapped than repaired.

Figure 3:
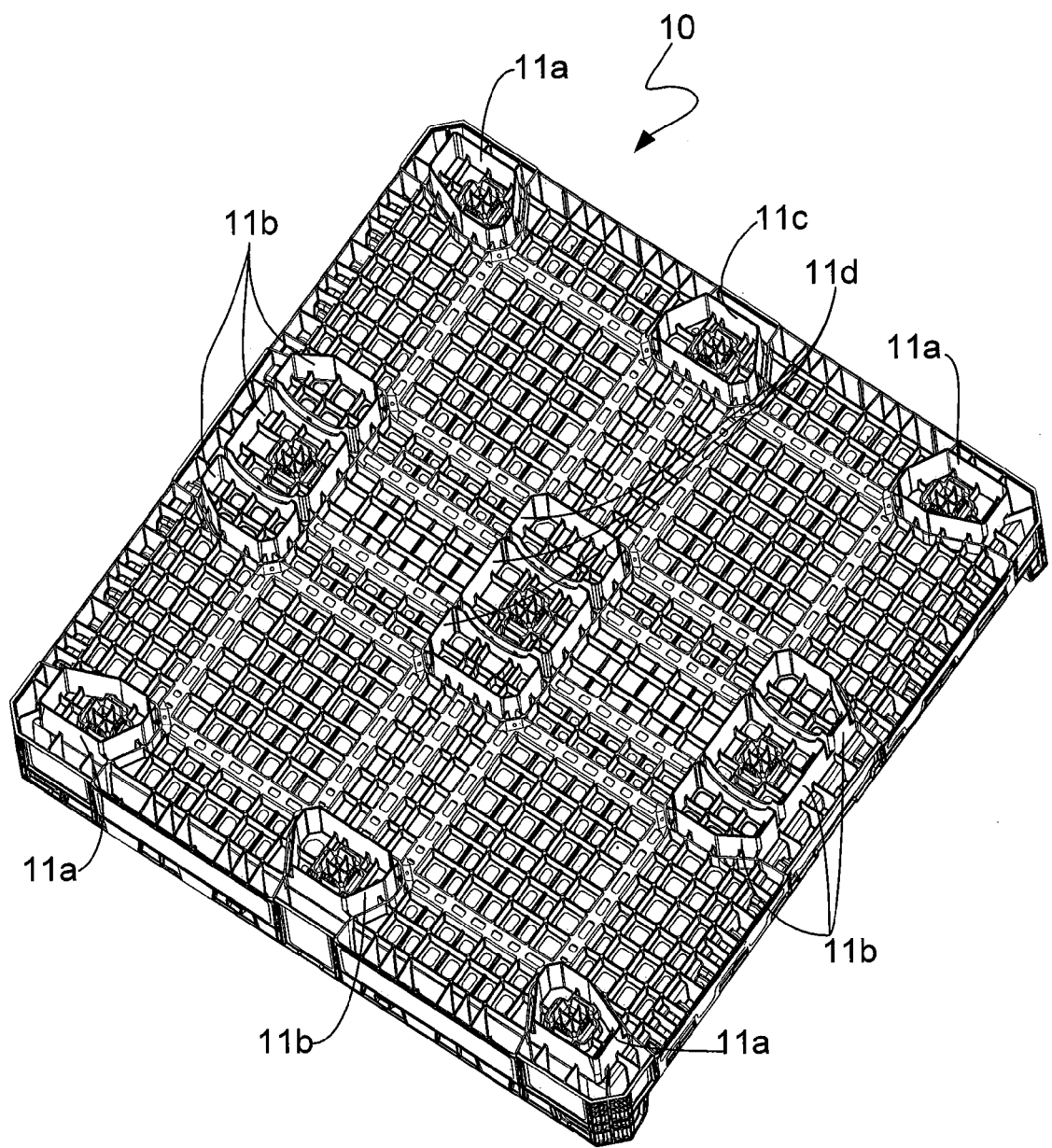
FIG. 3—Perspective illustration of the underneath side of the base of the embodiment illustrated in FIG. 1.
Figure 4:
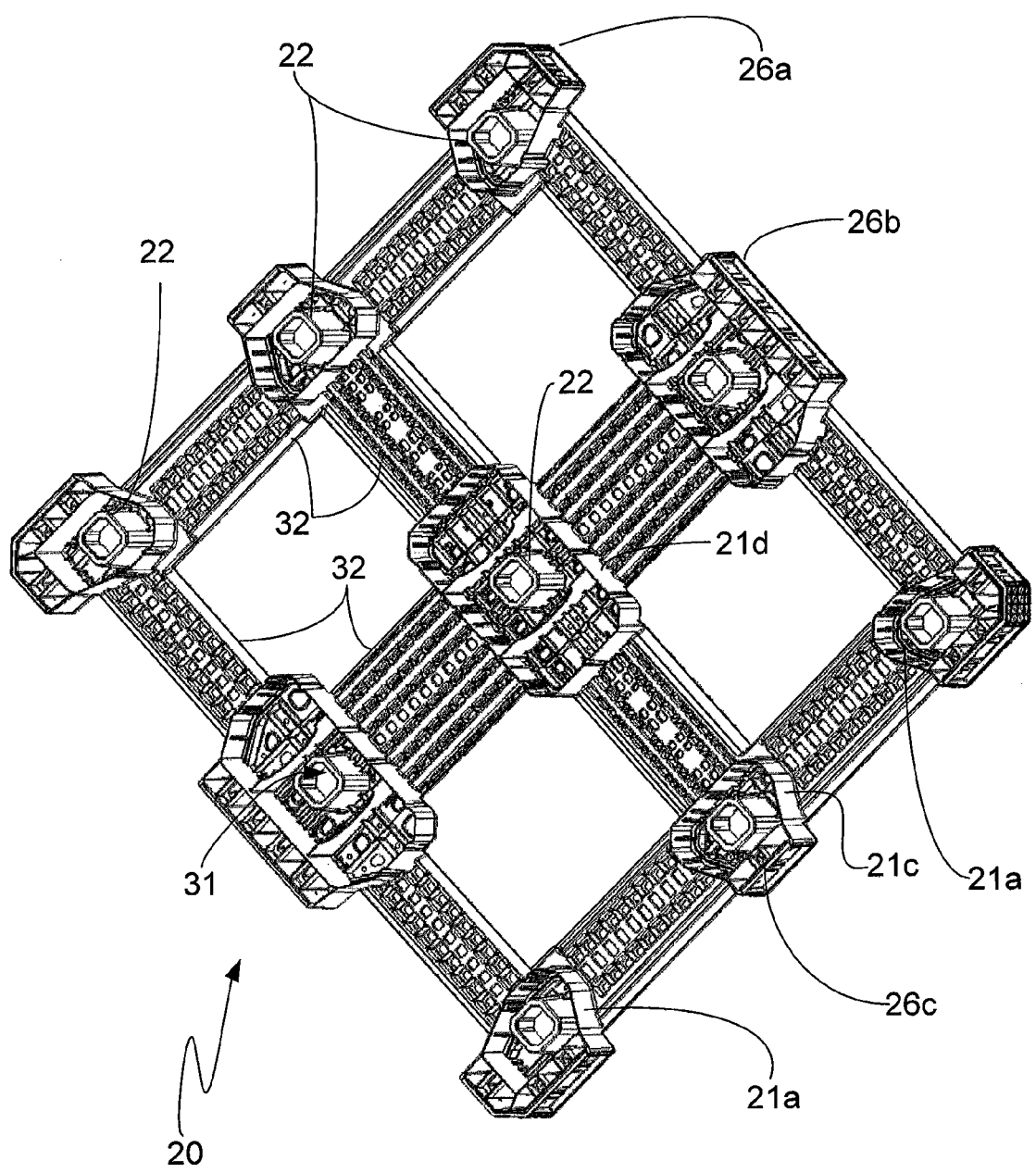
FIG. 4—Perspective illustration of the fork strap unit of the embodiment illustrated in FIG. 1.

This invention includes a novel bottom unit design that comprises base 10 and separate fork strap unit 20 with fork strap unit 20 being easily replaceable and much more durable in foot portions 1 than known container designs. In the invention, each foot portion 1 is comprised of at least four distinct components: outer impact wall 21 and female latch portion 22, both of which are integral to fork strap unit 20 (see FIG. 4), and inner impact wall 11 and male latch portion 12, both of which are integral to base 10 (see FIG. 3). In the particular illustrated embodiment, there are four distinct types of foot portions, 1a, 1b, 1c, and 1d, that relate to the location on container C where a particular foot portion is located. Where it is necessary to distinguish between the particular types of foot portions, the "a," "b," "c," or "d" designator will be used; otherwise the foot portions will hereinafter be referred to collectively as "1." Other features of the various foot portions will similarly be designated as "a," "b," "c," or "d" where necessary. Sidewalls 40 are connected to base 10, and the connection may be permanent or removable.

Figure 5:
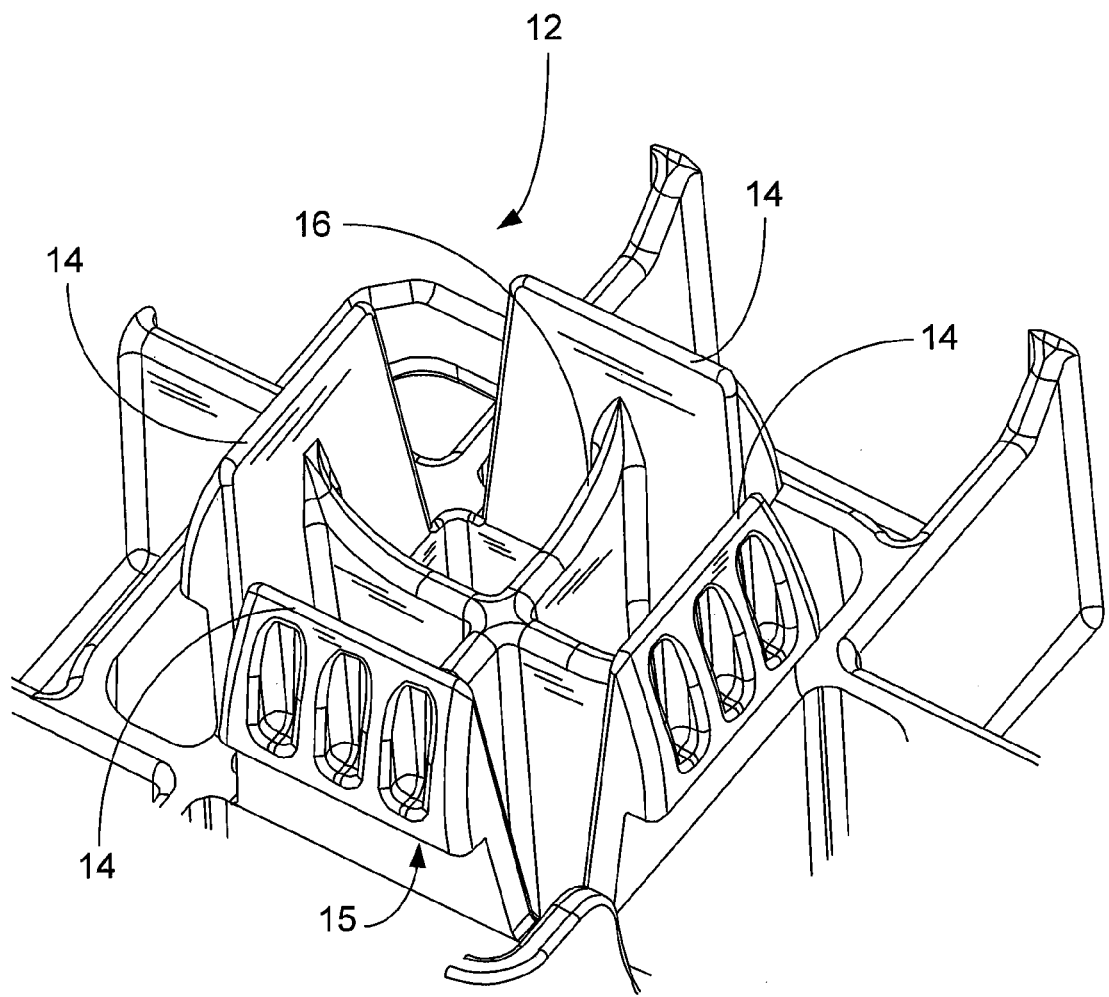
FIG. 5—Perspective illustration of the male portion of the male latch portion of the embodiment illustrated in FIG. 1.
Figure 6:
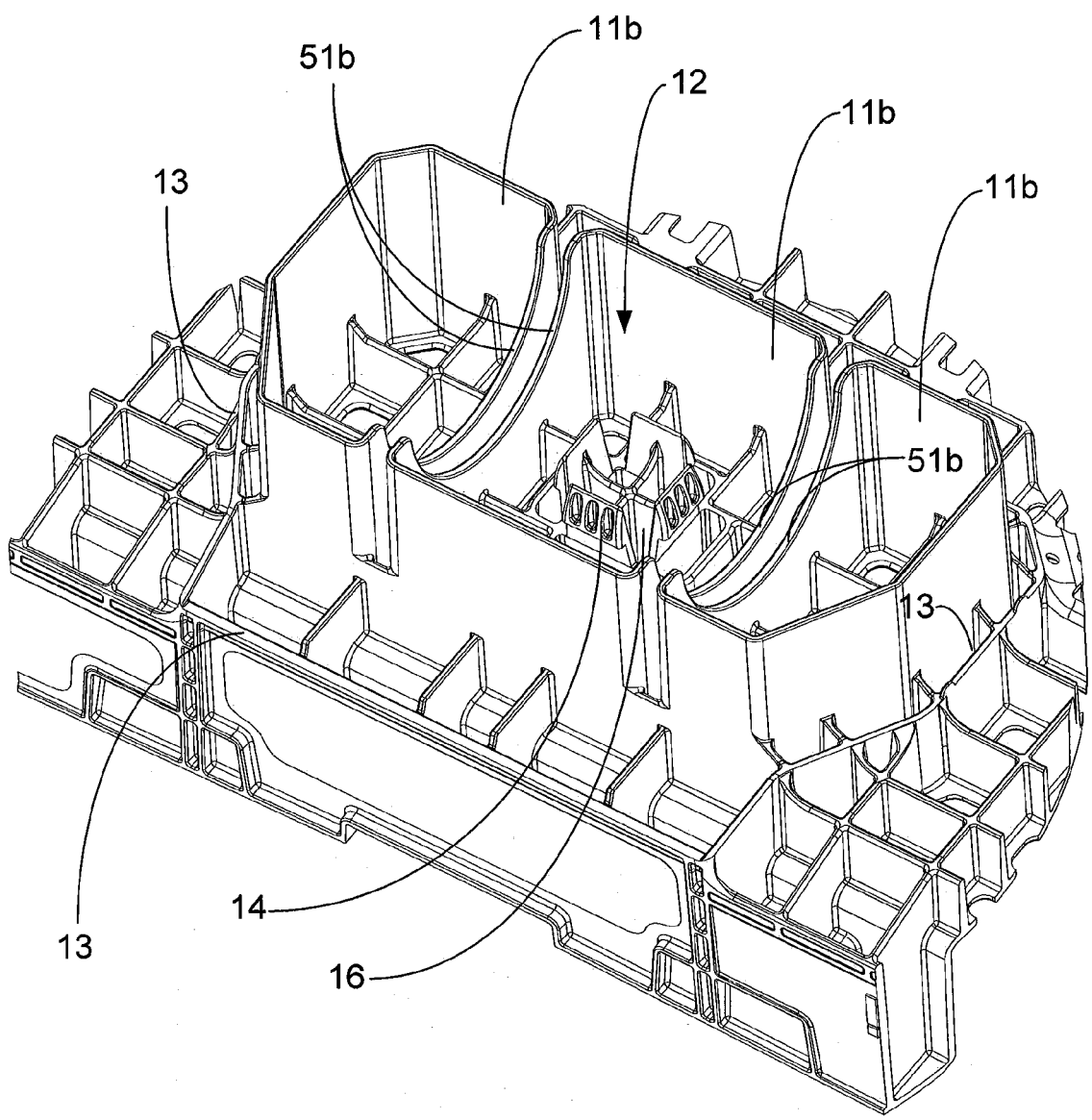
FIG. 6—Perspective illustration of the base portion of side foot portion 1b of the embodiment illustrated in FIG. 1.
Figure 7:
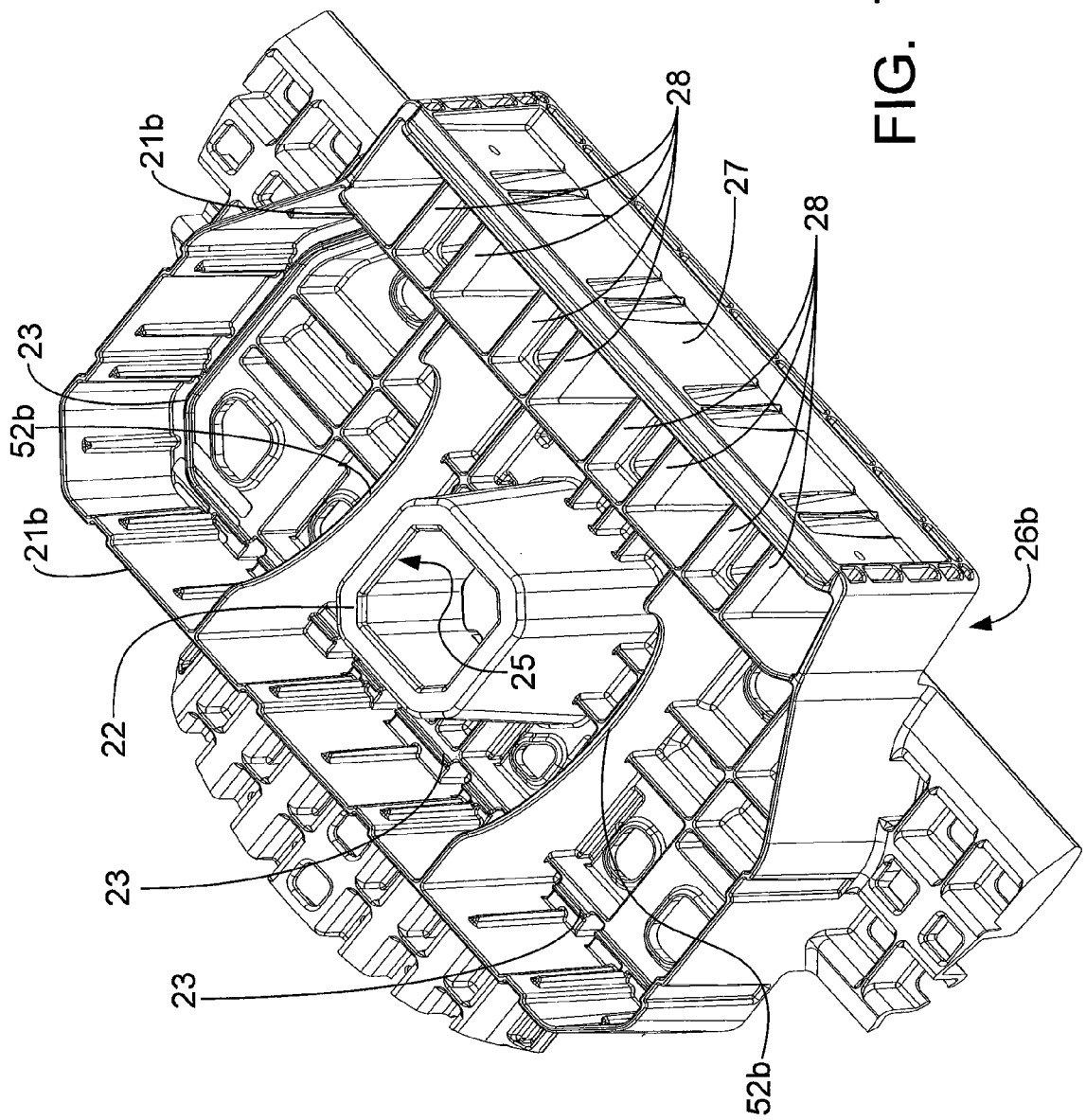
FIG. 7—Perspective illustration of the fork strap unit portion of side foot portion 1b of the embodiment illustrated in FIG. 1.
Figure 8:
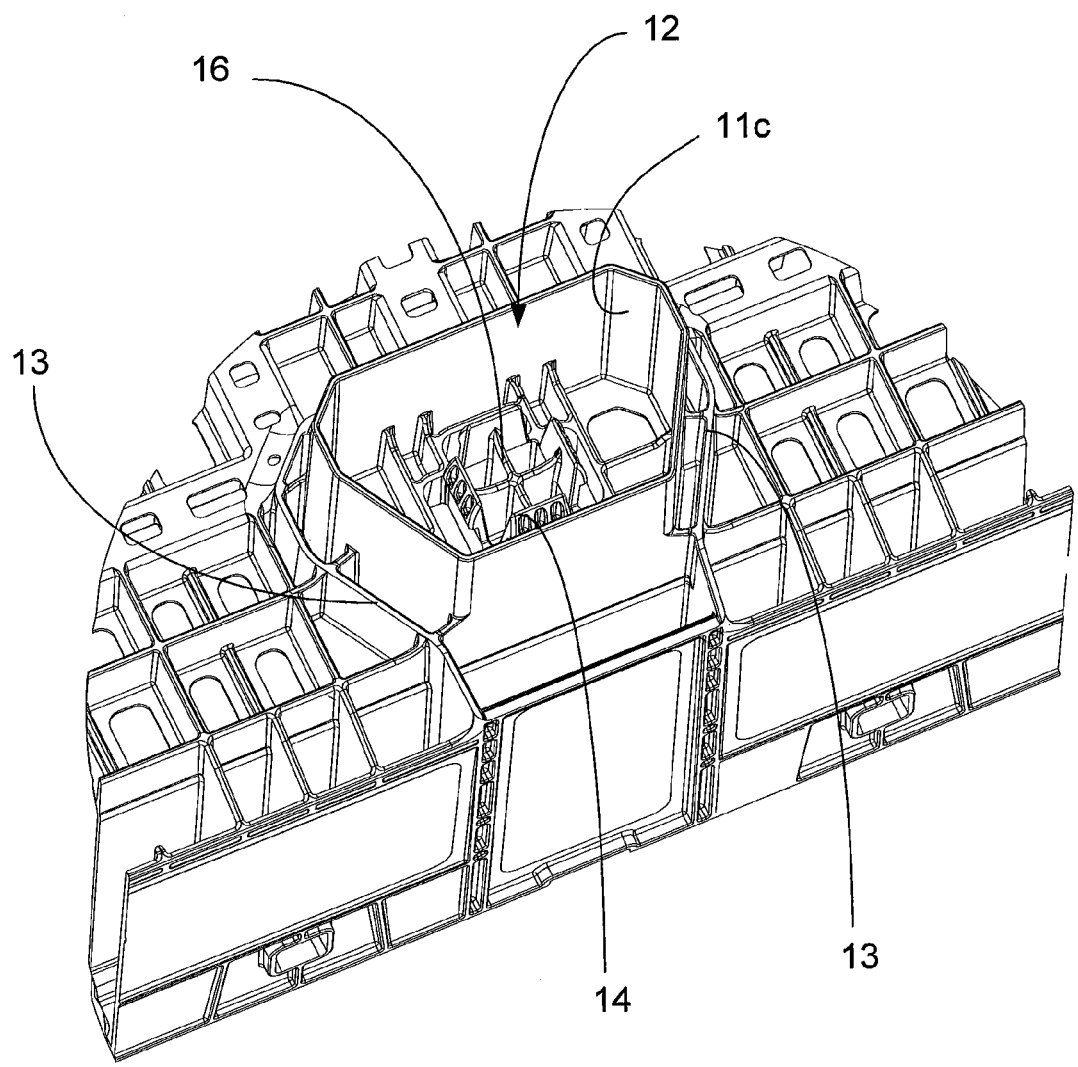
FIG. 8—Perspective illustration of the base portion of side foot portion 1c of the embodiment illustrated in FIG. 1.
Figure 9:
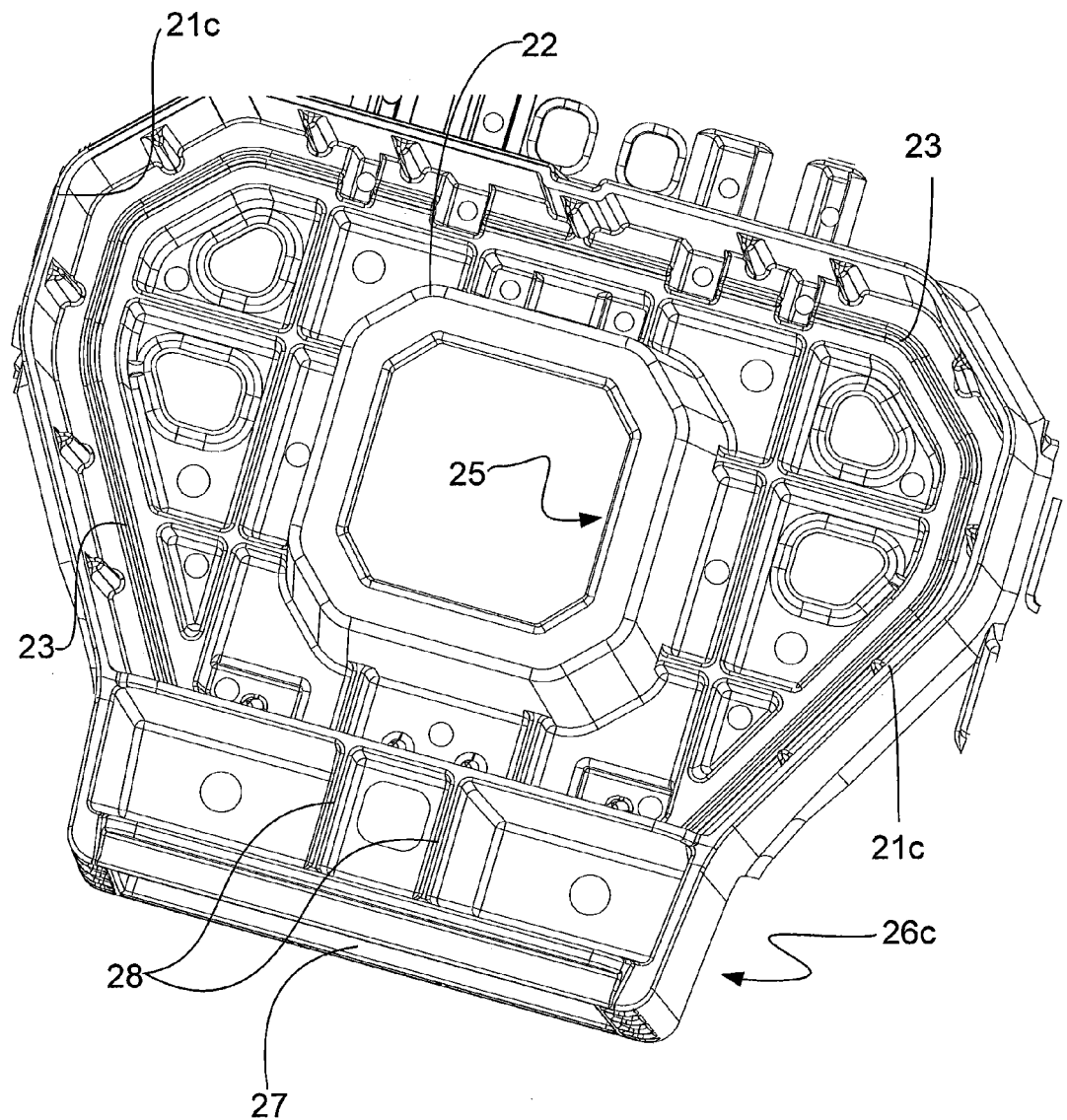
FIG. 9—Perspective illustration of the fork strap unit portion of side foot portion 1c of the embodiment illustrated in FIG. 1.
Figure 10:
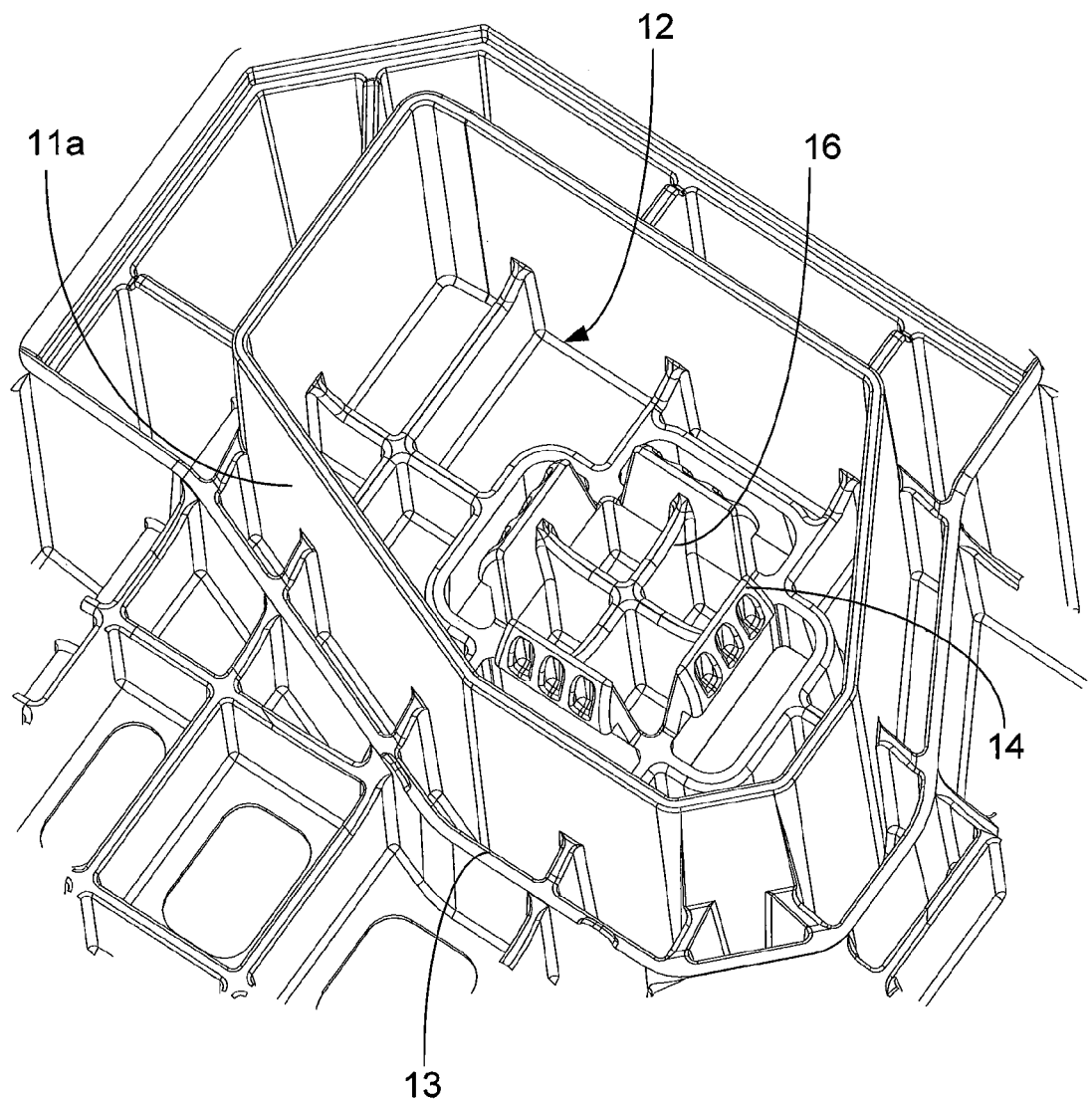
FIG. 10—Perspective illustration of the base portion of corner foot portion 1a of the embodiment illustrated in FIG. 1.
Figure 11:
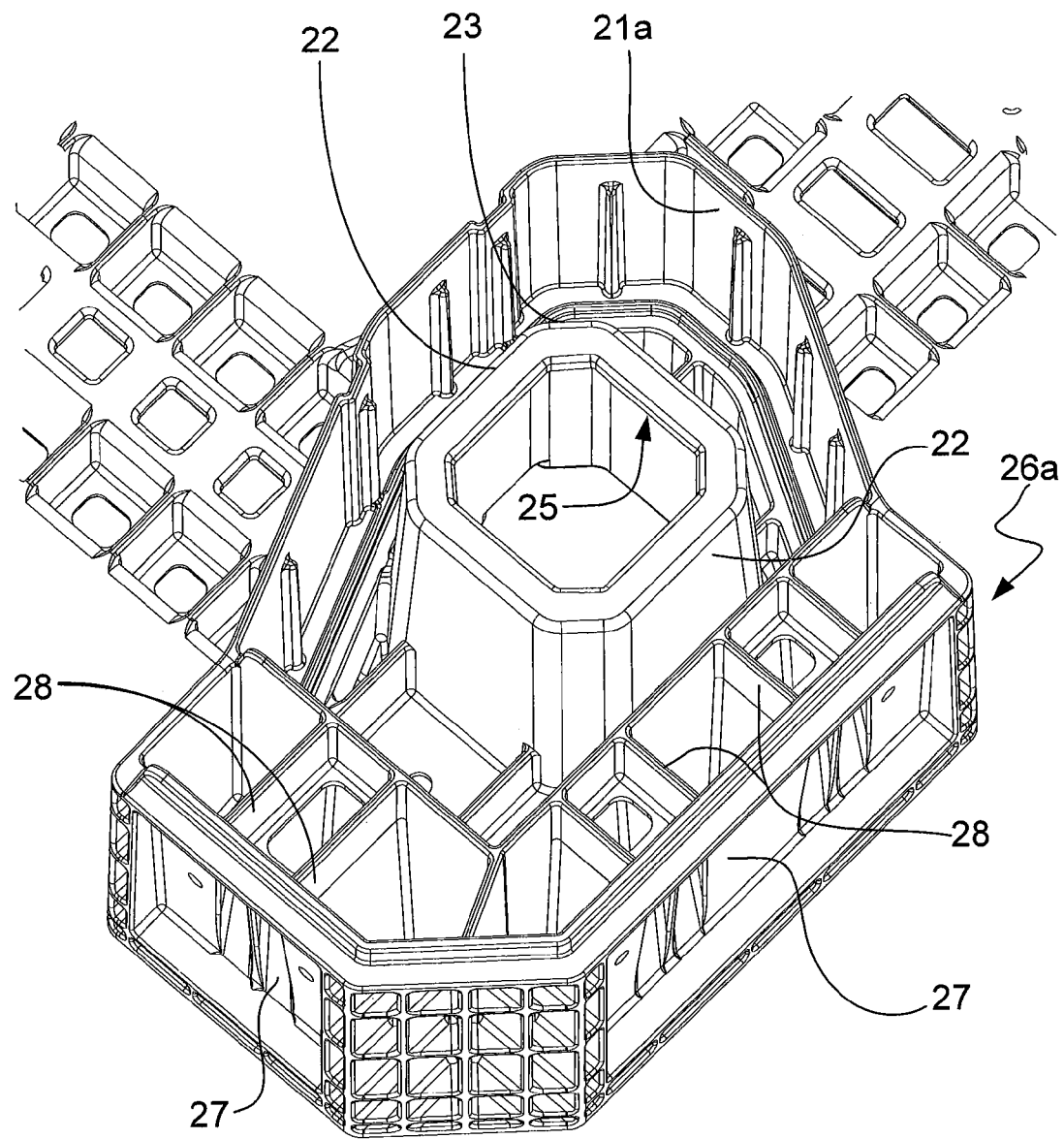
FIG. 11—Perspective illustration of the fork strap unit portion of corner foot portion 1a of the embodiment illustrated in FIG. 1.
Figure 12:
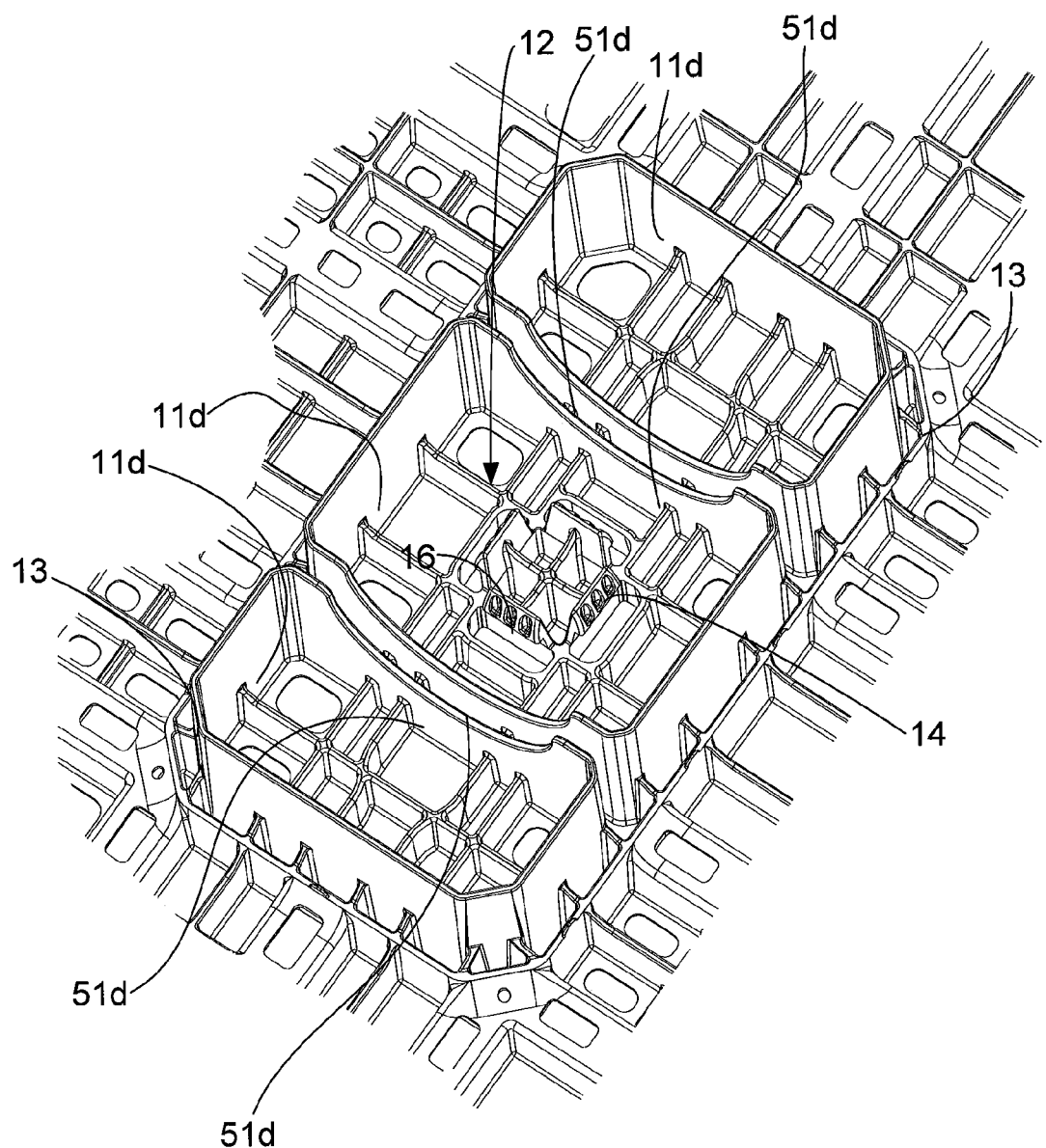
FIG. 12—Perspective illustration of the base portion of center foot portion 1d of the embodiment illustrated in FIG. 1.
Figure 13:
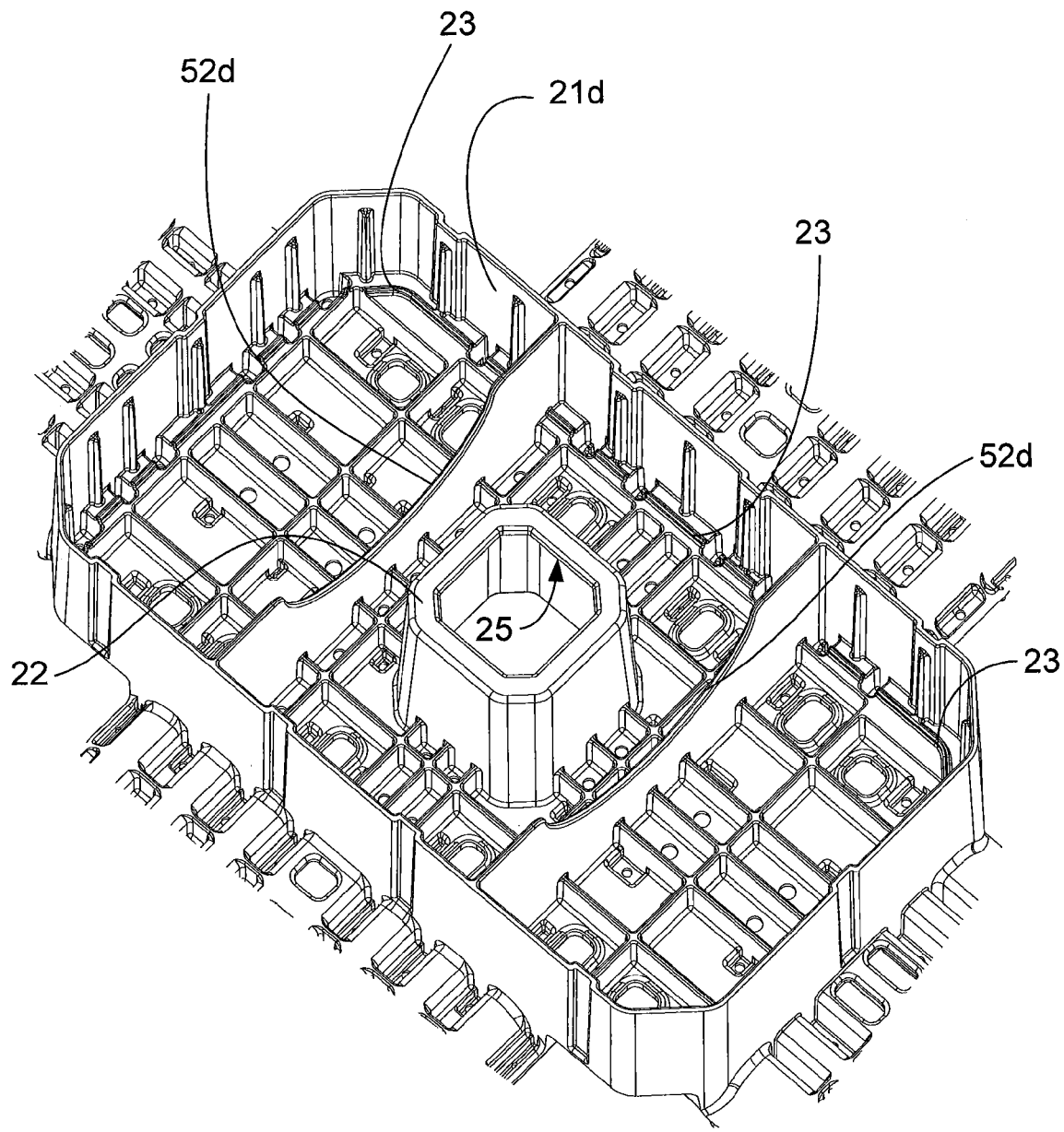
FIG. 13—Perspective illustration of the fork strap unit portion of center foot portion 1d of the embodiment illustrated in FIG. 1.

In the illustrated embodiment, male latch portions 12 are comprised of four spring members 14 that are ramped to facilitate insertion into female latch portions 22 (see FIG. 5). The ramped portion of spring members 14 terminate in male latching surface 15 that is designed to engage the corresponding female latching surface 25 of female latch portions 22. To provide added rigidity to spring members 14, reinforcing ribs 16 may be provided in the central portion of male latch portions 12. Also, in the illustrated embodiment, each female latch portion 22 comprises a housing having central opening 24 to receive spring members 14 (see, e.g. FIG. 7). Of course, without varying from the principles and scope of the invention, the female and male latch portions of the invention could take different forms and the female latch portion could be included as part of base 10 and the male latch portion could be included as part of forkstrap unit 20.

Figure 14:
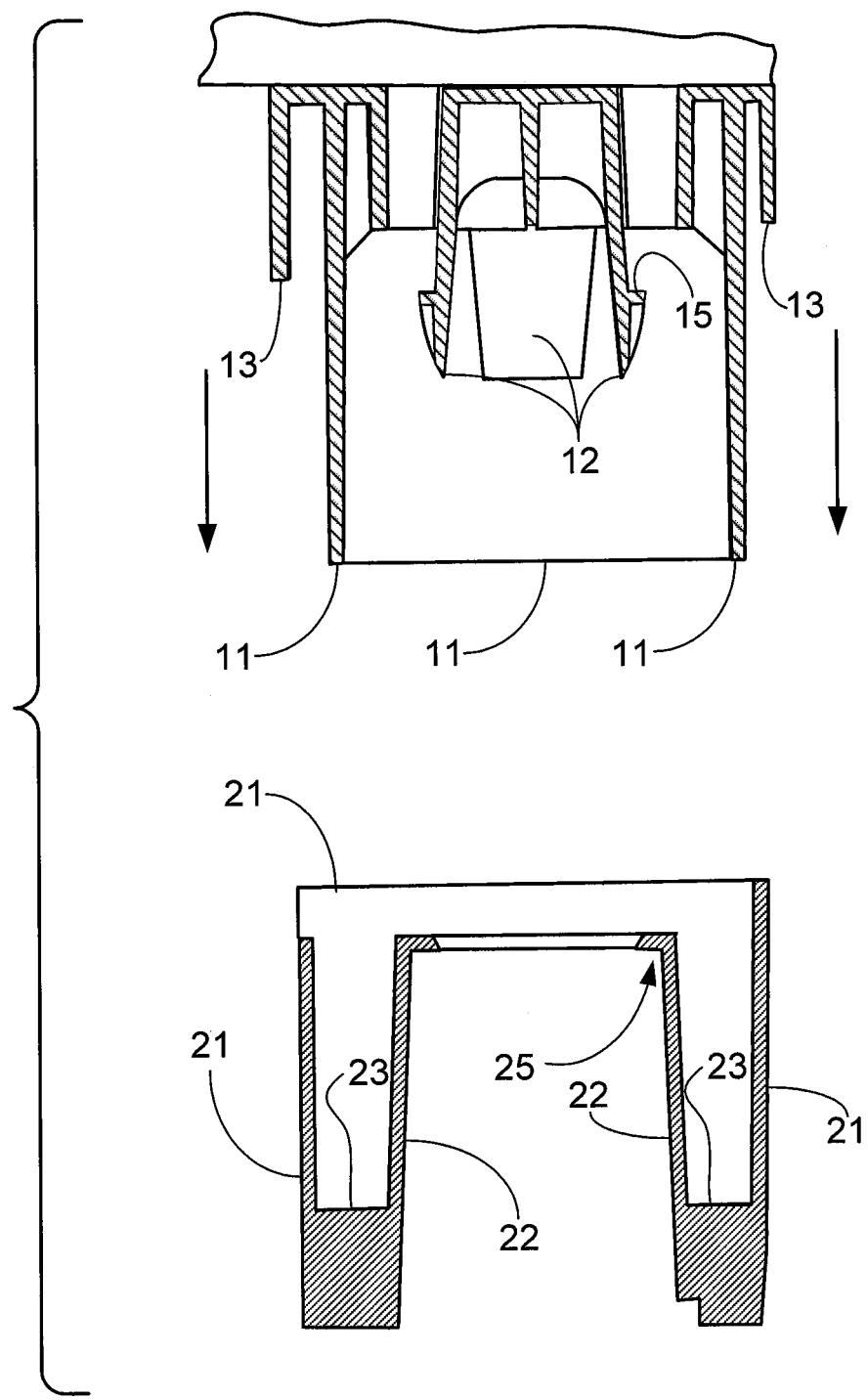
FIG. 14—Cross-sectional illustration of an exemplary foot area of the fork strap unit and the base of the embodiment with the base and fork strap unit separate.
Figure 15:
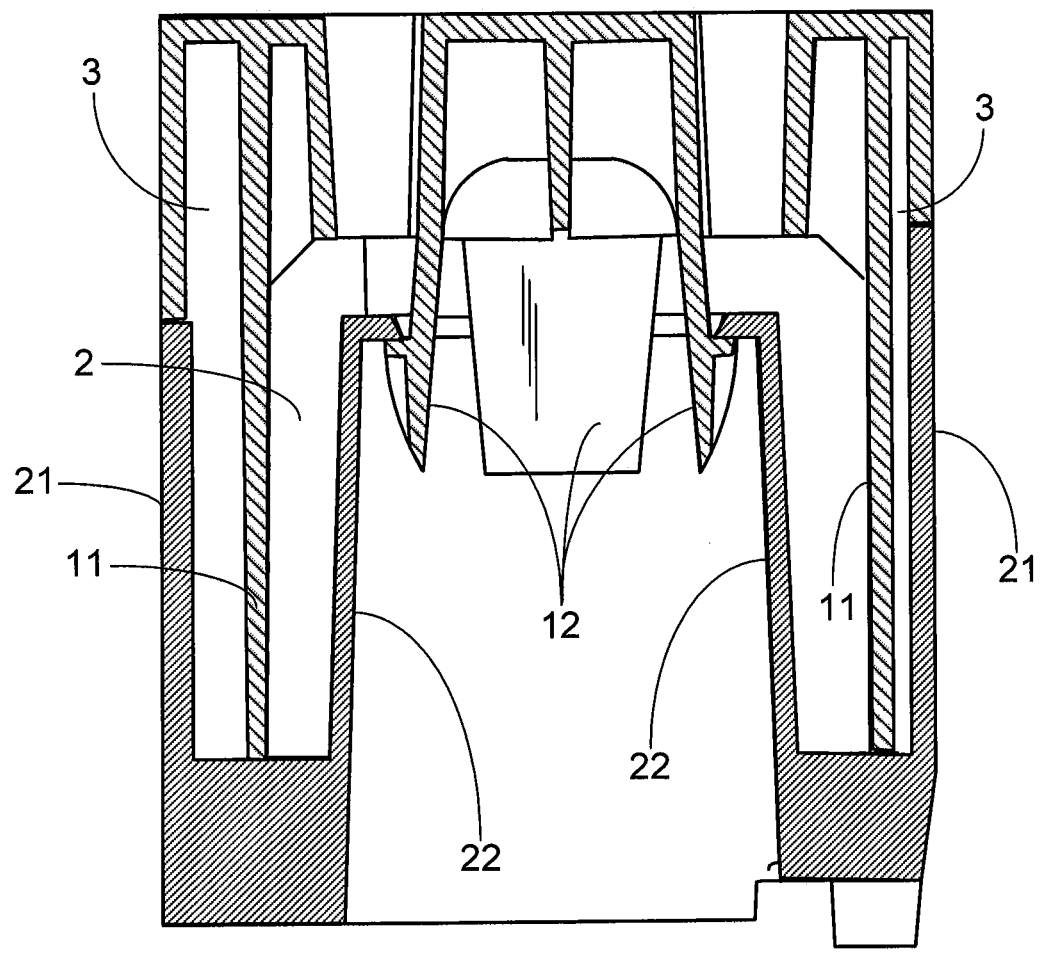
FIG. 15—Cross-sectional illustration of an exemplary foot area of the fork strap unit and the base of the embodiment with the base and fork strap unit connected.

When fork strap unit 20 is assembled to base 10, male latch portions 12 of base 10 slide into and removably connect with female latch portions 22 of fork strap unit 20. When fork strap unit 20 is assembled to base 10, inner impact walls 11 of base 10 surround female latch portions 22 of fork strap unit 20 and are sized to provide gaps 2 between inner impact walls 11 and female latch portions 22. When fork strap unit 20 is assembled to base 10, outer impact walls 21 of fork strap unit 20 surround inner impact walls 11 and are sized to provide gaps 3 between outer impact walls 21 and inner impact walls 11. FIGS. 14 and 15 provide an illustrative cross-sectional view of the interconnection between base 10 and fork strap unit 20.

In the particular embodiment of the invention depicted in FIGS. 1-13 and 16, it should be noted that inner impact walls 11b and 11d of the larger foot portions 1b and 1d are not completely continuous. In this particular embodiment, inner impact walls 11b and 11d are formed in three sections to provide reinforcing ribs 51b and 51d on base unit 10. Reinforcing ribs 51b and 51d provide added stability to inner impact walls 11b and 11d. In addition, reinforcing ribs 51b and 51d are spaced apart to provide a gap allowing outer impact walls 21b and 21d respectively to be provided with reinforcing ribs 52b and 52d respectively.

In use, this structure creates foot portions that can absorb more energy from fork truck strikes without breaching the structural integrity of the foot portions than any known design. This results from the fact that a fork must breach outer impact wall 21, traverse gap 3, breach inner impact wall 11, and traverse gap 2 before the fork can cause damage to the latch portions 22 and 12 that interconnect base 10 and fork strap unit 20. Gaps 2 and 3 are illustrated in FIG. 15. Moreover, to damage the portion male latch portion 12, which is integral to the base—the most expensive portion of container C to replace, it would be necessary for the fork to breach, or seriously disfigure, female latch portion 22.

In addition to providing impact protection, inner impact walls 11 of base 10 and outer impact walls 21 of fork strap unit 20 provide vertical support for container C. Inner impact wall 11 is provided with height h1 to allow it to contact support area 23 on forkstrap unit 20 when base 10 is connected to forkstrap unit 20. Similarly, outer impact wall is provided with height h2 to allow it to contact support area 13 on base 10 when base 10 is connected to forkstrap unit 20. In the illustrated embodiment, inner impact walls 11 and outer impact walls 21 are designed to impinge on support areas 23 and 13 respectively as male latch surfaces 15 engage female latch surfaces 25. This relation can be observed in FIGS. 14 and 15, and this relation serves to further protect male latch portions 12 and female latch portions 22 since latch portions 12 and 22 do not bear any of the vertical load of the weight of the base, the sidewalls, and any material stored in the container when the container is resting on a flat surface or being supported by the forks of a fork truck or by a pallet jack.

In the illustrated embodiment, where a foot portion 1 is aligned with the exterior of the container, it is provided with further impact protection in the form crumple zones 26, which are integral to forkstrap unit 20. For example, foot portions 1a, which are located at the corners of container C, are protected by crumple zones 26a that extend around the two exterior sides of foot portions 1a. Similarly, foot portions 1b and 1c, which are located in the center of the exterior sides of container C, are protected by crumple zones 26b and 26c respectively that extend only along the exterior side of container C. In certain applications, additional crumple zones 26 may be provided to protect the sides of foot portions 1 that are adjacent to the fork receiving openings of container C.

In the illustrated embodiment, crumple zones 26 comprise fork shield 27 that is spaced apart from outer impact walls 21 using a series of ribs 28 to provide additional structure to absorb impact from fork strikes. This provides greatly enhanced protection because a fork would have to not only penetrate an additional impact surface, it would also have to traverse a gap that is further protected by ribs 28 before the fork could damage outer impact walls 21. Base 10 can additionally be provided with additional supporting members 15 that can mate to upper surface 30 of crumple zones 26 to provide additional support for base 10.

Providing such protection to latch portions 12 and 22 also facilitates the replacement of fork unit 20 should fork unit 20 become damaged, for example by having one or more of fork straps 32 broken. Should such damage occur, a tool can be inserted into orifice 31 (see FIG. 4) of female latch portions 22 to release male latch portions 12 to allow the damaged fork strap unit 20 to be removed and replaced with a new fork strap unit 20. This differs from many known designs with an integral base and fork strap unit for which such damage would require removing the sides of the container and attaching them to a new integral base and fork strap unit. It also differs from designs wherein the fork straps snap into the container's feet because such straps often cannot be replaced due to damage suffered by the feet that extend downward from the base of the container and are exposed to direct impact from the forks of a forklift.

Numerous users of reusable shipping containers require that there be no fork strap at the floor level in one direction to allow the use of a hand pallet jack to lift the container without damaging the container. To accommodate this need, known containers either require cutting off fork straps 32 in one direction or producing the container without fork straps 32 in one direction. Either of these options requires lowering the capacity rating of the container, however. The lower rating is typically avoided by adding strength to the base by using more material to the base or by adding metal or other support mechanisms to the base, but these solutions result in a heavier container that is more costly to produce and more costly to transport. Such reinforced containers can also reduce the overall load of the goods being shipped in a particular vehicle due to weight restrictions.

Figure 16:
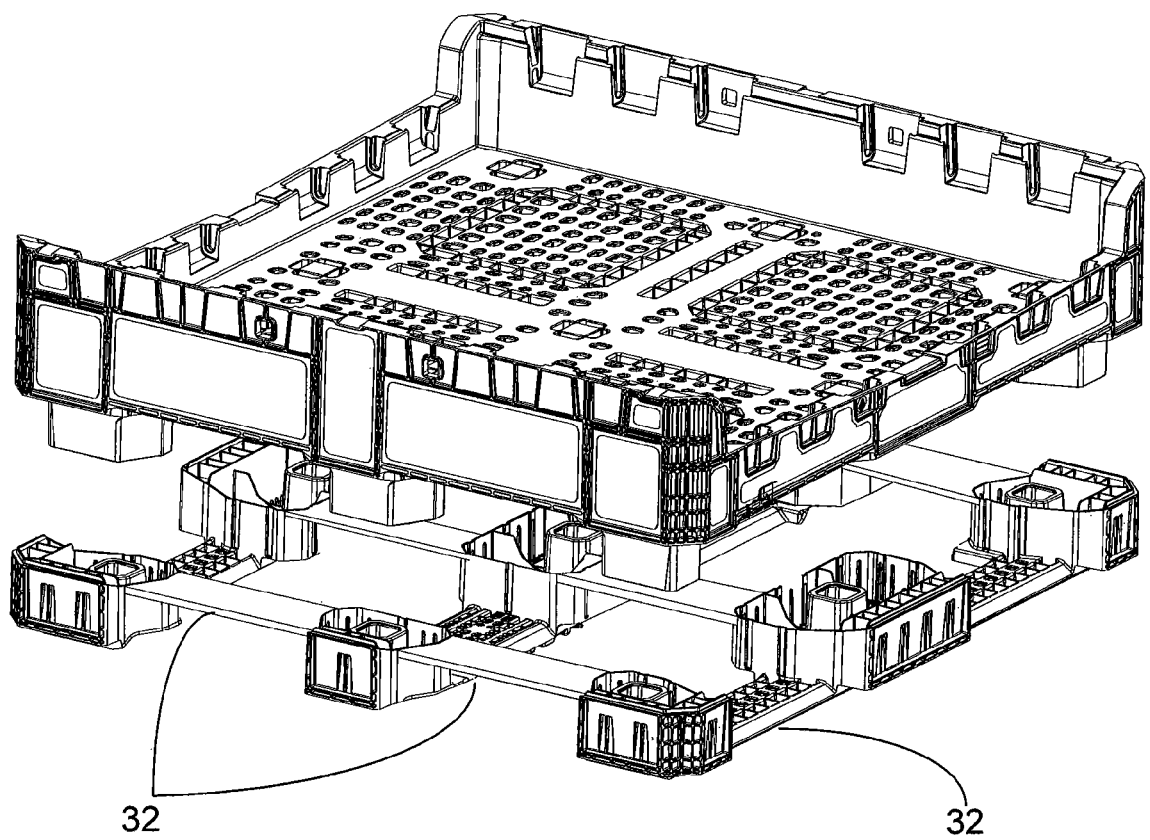
FIG. 16—Exploded perspective view of the base and the fork strap unit portions of embodiment of the invention with elevated fork straps.

The present invention, however, easily addresses this need without increasing the weight of the container or reducing its capacity. This is accomplished by forming fork straps 32 of fork strap unit 20 in one direction at the top, rather than the bottom, of the foot portions as shown in FIG. 16. This provides the benefit of the structure from the fork strap and eliminates the need to modify base 20 to get the same capacity rating for the container.

Much of the material shipped in reusable shipping containers requires the use of various types of dunnage to prevent damage to the material being shipped. Many times this dunnage requires the user of a container to modify the sidewalls of the container to be able to fasten the dunnage to the container. This customization can come in many forms and can be labor intensive and compromise the integrity of the sidevvall of the container. The present invention integrates into the sidewalls of the container a means for attaching the dunnage thereby eliminating the need to modify the sidewall. This also allows the integrity of the container to be maintained.

Figure 1:
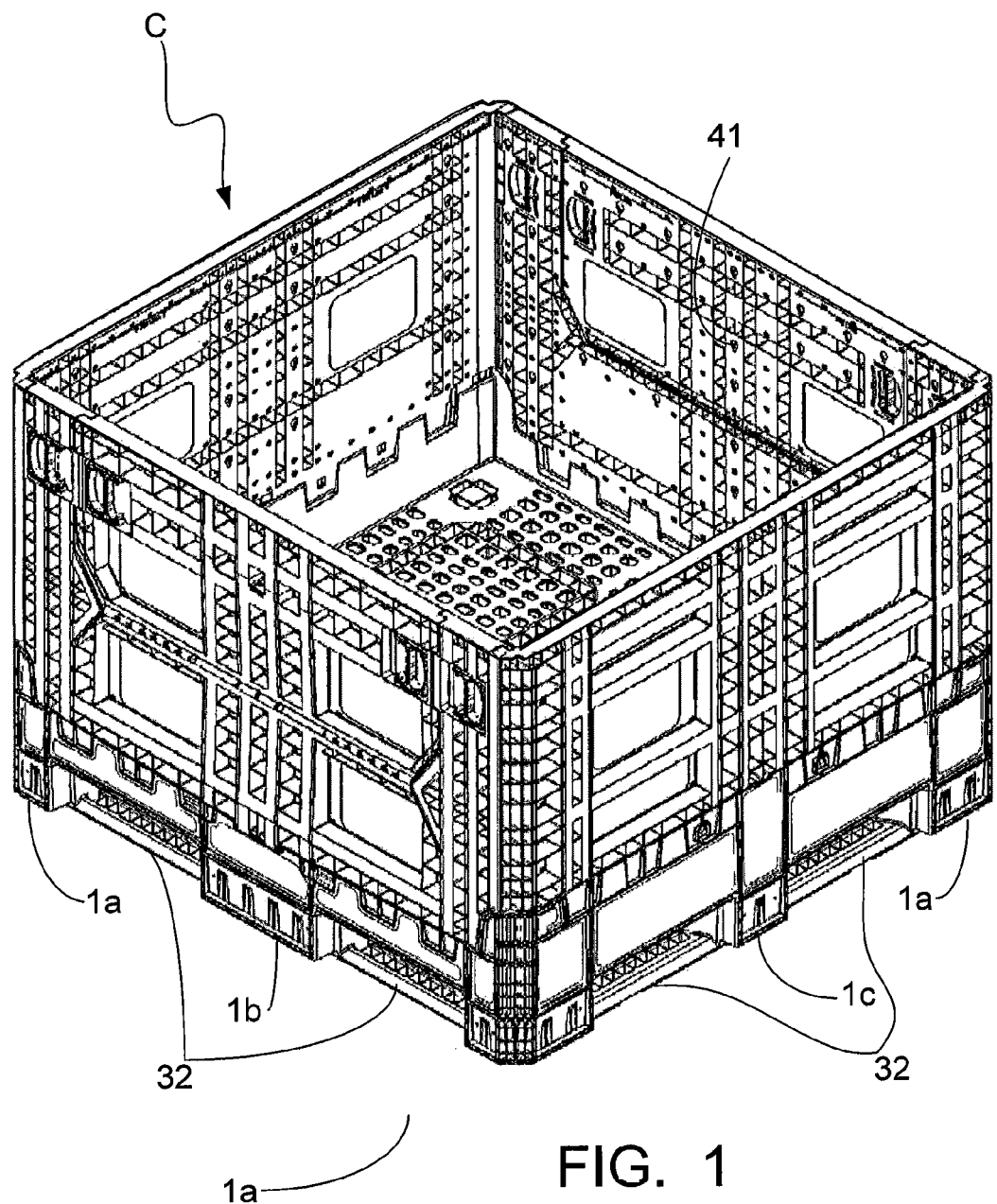
FIG. 1—Perspective illustration of an embodiment of the invention.
Figure 2:
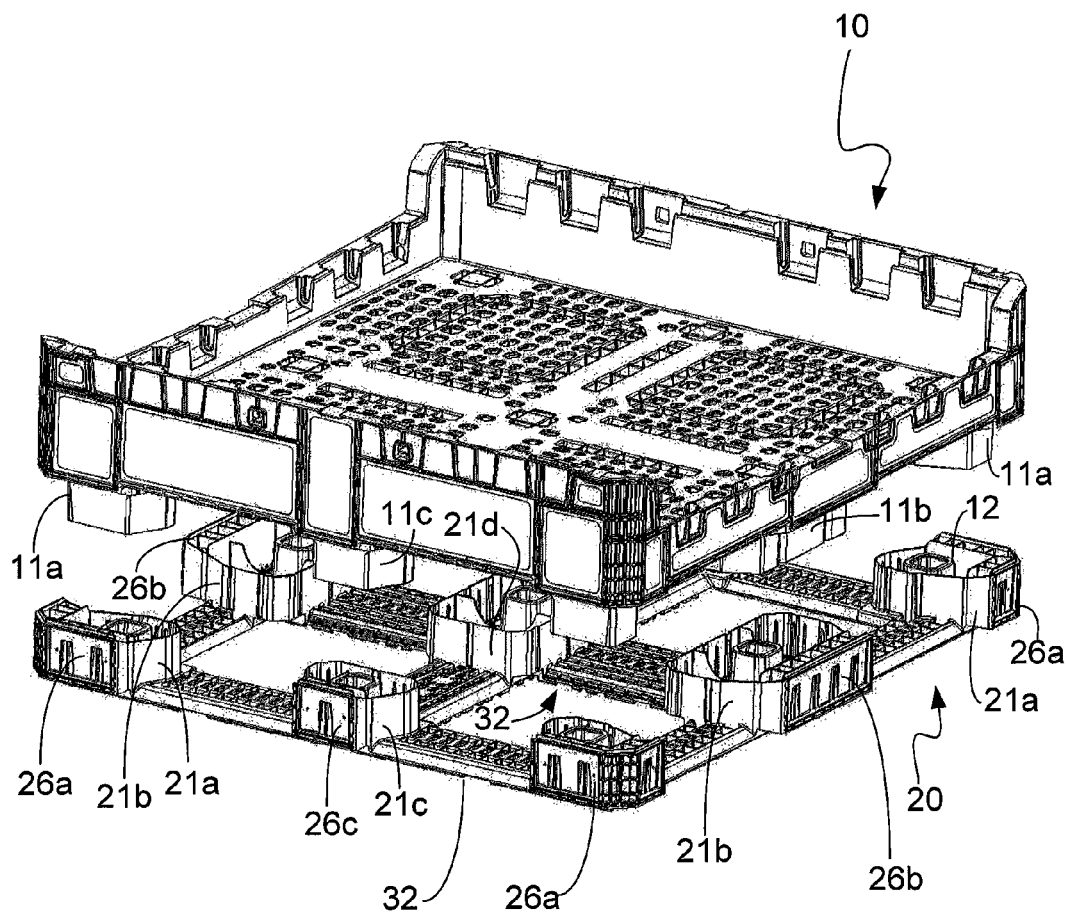
FIG. 2—Exploded perspective view of the base and the fork strap unit portions of the embodiment illustrated in FIG. 1.

In the illustrated embodiment, sidewalls 40 of the container are molded with a series of dunnage attachment points 41 (see FIG. 1). In the illustrated embodiment, each attachment point 41 is formed in the shape of a "keyhole" that will allow the head of a screw or other similar device to pass thru the sidewall and then be pushed down into a slot to restrict the movement of the head of the screw. Attachment points 41 could also be formed in other shapes to accomplish a similar result; for example the lower portion of the keyhole could be formed in the shape of the lower three sides of a hexagon to accept a standard sized bolt head. In practice, the dunnage could comprise rods adapted to lock into attachment points 41 on opposing side of container C. In other embodiments, the dunnage could comprise shelves attached to each side of the container or full height dividers. The slot is also designed such that as the fastener is pushed down the tension increases thereby holding the fastener tight. This novel invention saves users of the containers a great deal of time and expense.

In a preferred embodiment, the container is plastic and formed exclusively via injection molding, which represents a large weight savings over known container designs that are formed of metal or via structural foam molding.

The foregoing described embodiments are exemplary in nature and are not intended to limit the scope of the invention.

We claim:

1. A reusable shipping container comprising:
   a substantially rectangular bottom unit, said bottom unit further comprising
      a base, said base having an upper surface and a lower surface;
      a fork strap unit, said fork strap unit having an upper surface and a lower surface, and said fork strap unit being releasably connected to said base using a plurality of connectors, each connector of said plurality of connectors further comprising
         a male latch portion extending downward from the bottom surface of the base, said male latch portion comprising at least one spring member terminating in a ramped end portion and at least one male latching surface defined by the ramped end portion of the at least one spring member and
         a female latch portion defined by the fork strap unit, said female latch portion further comprising a housing, said housing defining a central opening for receiving said at least one spring member of the male latch portion and said housing defining a female latching surface around a periphery of said central opening wherein none of said plurality of connectors bear a vertical load from the weight of the base;
      a plurality of inner impact walls extending downward from the base wherein, when the fork strap unit is releasably connected to the base, each of the plurality of connectors is surrounded by one of the plurality of inner impact walls and each of the plurality of inner impact walls has a height such that each inner impact wall contacts the upper surface of forkstrap unit and bears a portion of the vertical load of the base and
      a plurality of outer impact walls extending upward from the fork strap unit wherein, when the fork strap unit is releasably connected to the base, each of the plurality of inner impact walls is surrounded by one of the plurality of outer impact walls and each of the outer impact walls has a height such that each outer impact wall contacts the bottom surface of the base and bears a portion of the weight of the base wherein
      each of the inner impact walls has a perimeter that provides a gap between an inner surface of the inner impact wall and the connector the inner impact wall is surrounding and
      each of the outer impact walls has a perimeter that provides a gap between an inner surface of the outer impact wall and the inner impact wall the outer impact wall is surrounding.

2. The reusable shipping container of claim 1 wherein each male latch portion of the plurality of male latch portions further comprises four spring members, wherein the four spring members are arranged about the perimeter of a rectangle with the ramped end portion of each spring member facing outward away from the rectangle.

3. The reusable shipping container of claim 2 wherein each male latch portion further comprises:
   a reinforcing rib extending from the rectangular portion of the base unit defined by the four spring members such that said reinforcing rib is in contact with the spring members and provides additional resistance to the spring members being bent toward a central portion of said rectangle.

4. The reusable shipping container of claim 1 wherein the plurality of connectors further comprises:
   a central connector, four side connectors, and four corner connectors wherein
      the central connector is located at a central portion of the bottom unit;
      each of the four corner connectors is located at a different corner portion of the bottom unit; and
      each of the four side connectors is located intermediate two of the corner connectors along a different side portion of the bottom unit.

5. The reusable shipping container of claim 4 further comprising:
   a plurality of crumple zones wherein each crumple zone is associated with one of the corner connectors or one of the side connectors and each crumple zone further comprises
      a fork shield that is substantially parallel to the portion of the outer impact wall of the connector with which the crumple zone is associated that runs along an exterior portion of the container and
      a plurality of ribs extending outward from the outer impact wall with which the crumple zone is associated to an inner surface of the fork shield.

6. The reusable shipping container of claim 4 wherein the fork strap unit further comprises:
   a plurality of integral perimeter fork straps extending between the outer impact wall of each of the corner connectors and the outer impact walls of the side connectors adjacent to that corner connector and
   a plurality of integral central fork straps extending between the outer impact wall surrounding the central connector and the outer impact walls surrounding each of the side connectors.

7. The reusable shipping container of claim 6 wherein:
   at least one of the perimeter fork straps extends from the portions of the outer impact walls that are adjacent to the base when the fork strap unit is connected to the base and
   at least one of the central fork straps extends from the portions of the outer impact walls that are adjacent to the base when the fork strap unit is connected to the base such that when the container is placed on a flat surface there is a gap between said fork straps and the surface.

8. The reusable shipping container of claim 6 wherein:
   the central fork straps extending between the outer impact wall surrounding the central connector and the outer impact walls surrounding one pair of opposing side connectors are elevated such that when the container is placed on a flat surface there is a gap between said fork straps and the surface and the perimeter fork straps that are parallel to the central fork straps that are elevated are similarly elevated.

9. The reusable shipping container of claim 1 further comprising:
a crumple zone extending from each outer impact wall that runs along a side portion of the container, each crumple zone including a fork shield that is generally parallel to the outer impact wall and that is connected to the outer impact wall via a plurality of ribs that are substantially perpendicular to the outer impact wall and the fork shield.

10. The reusable shipping container of claim 1 wherein:
at least one of the plurality of inner impact walls is non-continuous.

11. The reusable shipping container of claim 1 wherein:
at least one of the plurality of inner impact walls is supported by at least one reinforcing rib extending from a first portion of the inner impact wall to a second portion of the inner impact wall and
at least one of the plurality of outer impact walls is supported by at least one reinforcing rib extending from a first portion of the outer impact wall to a second portion of the outer impact wall.

12. The reusable shipping container of claim 1 further comprising:
a plurality of sidewalls arising from a perimeter portion of the base of the bottom unit; each sidewall of said plurality defining therein a plurality of dunnage attachment points, each dunnage attachment point comprising a slot that will allow an article of dunnage to be inserted and retained in said slot.

13. The reusable shipping container of claim 12 wherein each of said plurality of sidewalls is detachably connected to the base.

14. A reusable shipping container comprising:
a substantially rectangular bottom unit, said bottom unit including a base and a fork strap unit that cooperate to define a plurality of passage ways that permit a pair of substantially parallel members to be introduced from any side of the container that can be used to lift and move the container; and a plurality of container sides arising from a perimeter of the base unit wherein
the fork strap unit is releasably connected to the base using a plurality of connectors such that the connectors do not bear a vertical load from the weight of the base, the container sides, and any material that is contained in the container when the container is supported from underneath wherein when said fork strap unit is connected to said base, each of said plurality of connectors is surrounded by an inner impact wall having a perimeter that provides a gap between an inner surface of the inner impact wall and the connector surrounded by the inner impact wall and each of said inner impact walls is surrounded by an outer impact wall having a perimeter that provides a gap between an inner surface of the outer impact wall and the inner impact wall surrounded by the outer impact wall.

15. The reusable shipping container of claim 11 wherein:
each of the plurality of connectors further comprises a male connector portion that includes at least one spring member extending downward from the base toward the fork strap unit and terminates in a ramped portion that defines at least one male latching surface and a female connector portion integral to the fork strap unit that defines a central opening for receiving the at least one spring member and that includes a female latching surface defined by the perimeter of said central opening and the inner impact walls and the outer impact walls cooperate to bear the vertical load of the weight of the base, the container sides, and any material that is introduced to the container when the container is supported from underneath.

16. A reusable shipping container comprising:
a substantially rectangular bottom unit, said bottom unit including a base and a fork strap unit that is releasably connected to an underneath side of the base using a plurality of means for connecting wherein each of said plurality of means for connecting do not bear a vertical load when the fork strap unit is connected to the base;

each of said plurality of means for connecting is provided with a plurality of layers of impact protection further comprising
an inner impact wall surrounding each of said plurality of means for connecting, each inner impact wall having a perimeter that provides a gap between an inner surface of the inner impact wall and the means for connecting surrounded by the inner impact wall and
an outer impact wall surrounding each inner impact wall, each outer impact wall having a perimeter that provides a gap between an inner surface of the outer impact wall and the inner impact wall surrounded by the outer impact wall and the base and fork strap unit cooperate to define a plurality of passage ways that permit a pair of substantially parallel members to be introduced from any side of the container that can be used to lift and move the container.

17. The reusable shipping container of claim 16 wherein each means for connecting comprises a male latch portion and a female latch portion wherein the male latch portion extends from either the base or the fork strap unit and the female latch portion is defined by the opposing portion of the bottom unit.

18. A reusable shipping container comprising:
a base and
a fork strap unit wherein said fork strap unit is releasably attached to said base using a plurality of connectors, each connector further comprising a male latch member and a female latch member;
an inner impact wall surrounding each of said plurality of connectors, each inner impact wall having a perimeter that provides a gap between an inner surface of the inner impact wall and the connector surrounded by the inner impact wall; and
an outer impact wall surrounding each of said inner impact walls, each outer impact wall having a perimeter that provides a gap between an inner surface of the outer impact wall and the inner impact wall surrounded by the outer impact wall.

19. A reusable shipping container comprising:
a base and a fork strap unit wherein said fork strap unit is releasably attached to said base using a plurality of connectors, each connector further comprising a male latch member and a female latch member;
an inner impact wall surrounding each of said plurality of connectors;
an outer impact wall surrounding each of said inner impact walls; and a crumple zone extending from each outer impact wall that runs along a side portion of the container, each crumple zone including a fork shield that is generally parallel to the outer impact wall.

20. The reusable container of claim 19 wherein said fork shield is connected to the outer impact wall via a plurality of ribs that are substantially perpendicular to the outer impact wall and the fork shield.

21. A reusable shipping container comprising:
a base and
a fork strap unit wherein said fork strap unit is releasably attached to said base using a plurality of connectors, said plurality of connectors further comprising a central connector, four side connectors, and four corner connectors wherein the central connector is located at a central portion of the bottom unit, each of the four corner connectors is located at a different corner portion of the bottom unit, and each of the four side connectors is located intermediate two of the corner connectors along a different side portion of the bottom unit and each connector further comprising a male latch member and a female latch member;
an inner impact wall surrounding each of said plurality of connectors;
an outer impact wall surrounding each of said inner impact walls; and
a plurality of crumple zones wherein each crumple zone is associated with one of the corner connectors or one of the side connectors and each crumple zone further comprises
  a fork shield that is substantially parallel to the portion of the outer impact wall of the connector with which the crumple zone is associated that runs along an exterior portion of the container.

22. The reusable container of claim 21 further comprising a plurality of ribs extending outward from the outer impact wall with which the crumple zone is associated to an inner surface of the fork shield.

23. A reusable shipping container comprising:
a substantially rectangular bottom unit, said bottom unit further comprising
  a base, said base having a upper surface and lower surface;
  a fork strap unit, said fork strap unit having an upper surface and a lower surface, and said fork strap unit being releasably connected to said base using a plurality of connectors, each connector of said plurality of connectors further comprising
    a male latch portion extending downward from the bottom surface of the base, said male latch portion comprising at least one spring member terminating in a ramped end portion and at least one male latching surface defined by the ramped end portion of the at least one spring member and
    a female latch portion defined by the fork strap unit, said female latch portion further comprising a housing, said housing defining a central opening for receiving said at least one spring member of the male latch portion and said housing defining a female latching surface around a periphery of said central opening wherein none of said plurality of connectors bear a vertical load from the weight of the base;
a plurality of inner impact walls extending downward from the base wherein, when the fork strap unit is releasably connected to the base, each of the plurality of connectors is surrounded by one of the plurality of inner impact walls and each of the plurality of inner impact walls has a height such that each inner impact wall contacts the upper surface of forkstrap unit and bears a portion of the vertical load of the base;
a plurality of outer impact walls extending upward from the fork strap unit wherein, when the fork strap unit is releasably connected to the base, each of the plurality of inner impact walls is surrounded by one of the plurality of outer impact walls and each of the outer impact walls has a height such that each outer impact wall contacts the bottom surface of the base and bears a portion of the weight of the base; and
a crumple zone extending from each outer impact wall that runs along a side portion of the container, each crumple zone including a fork shield that is generally parallel to the outer impact wall and that is connected to the outer impact wall via a plurality of ribs that are substantially perpendicular to the outer impact wall and the fork shield.

24. A reusable shipping container comprising:
a substantially rectangular bottom unit, said bottom unit further comprising
  a base, said base having a upper surface and lower surface;
a fork strap unit, said fork strap unit having an upper surface and a lower surface, and said fork strap unit being releasably connected to said base using a plurality of connectors, the plurality of connectors further comprising
  a central connector, four side connectors, and four corner connectors wherein the central connector is located at a central portion of the bottom unit, each of the four corner connectors is located at a different corner portion of the bottom unit, and each of the four side connectors is located intermediate two of the corner connectors along a different side portion of the bottom unit; wherein each connector of said plurality of connectors further comprises
    a male latch portion extending downward from the bottom surface of the base, said male latch portion comprising at least one spring member terminating in a ramped end portion and at least one male latching surface defined by the ramped end portion of the at least one spring member and
    a female latch portion defined by the fork strap unit, said female latch portion further comprising a housing, said housing defining a central opening for receiving said at least one spring member of the male latch portion and said housing defining a female latching surface around a periphery of said central opening wherein none of said plurality of connectors bear a vertical load from the weight of the base;
a plurality of inner impact walls extending downward from the base wherein, when the fork strap unit is releasably connected to the base, each of the plurality of connectors is surrounded by one of the plurality of inner impact walls and each of the plurality of inner impact walls has a height such that each inner impact wall contacts the upper surface of forkstrap unit and bears a portion of the vertical load of the base;
a plurality of outer impact walls extending upward from the fork strap unit wherein, when the fork strap unit is releasably connected to the base, each of the plurality of inner impact walls is surrounded by one of the plurality of outer impact walls and each of the outer impact walls has a height such that each outer impact wall contacts the bottom surface of the base and bears a portion of the weight of the base; and a plurality of crumple zones wherein each crumple zone is associated with one of the corner connectors or one of the side connectors and each crumple zone further comprises a fork shield that is substantially parallel to the portion of the outer impact wall of the connector with which the crumple zone is associated that runs along an exterior portion of the container and a plurality of ribs extending outward from the outer impact wall with which the crumple zone is associated to an inner surface of the fork shield.

25. A reusable shipping container comprising:

a substantially rectangular bottom unit, said bottom unit further comprising a base, said base having a upper surface and lower surface;

a fork strap unit, said fork strap unit having an upper surface and a lower surface;

said fork strap unit being releasably connected to said base using a plurality of connectors, said plurality of connectors further comprising a central connector, four side connectors, and four corner connectors wherein the central connector is located at a central portion of the bottom unit, each of the four corner connectors is located at a different corner portion of the bottom unit, and each of the four side connectors is located intermediate two of the corner connectors along a different side portion of the bottom unit;

an inner impact wall surrounding each of said plurality of connectors; and an outer impact wall surrounding each of said inner impact walls;

the fork strap unit further comprising a plurality of integral perimeter fork straps extending between the outer impact wall of each of the corner connectors and the outer impact walls of the side connectors adjacent to that corner connector and a plurality of integral central fork straps extending between the outer impact wall surrounding the central connector and the outer impact walls surrounding each of the side connectors wherein the central fork straps extending between the outer impact wall surrounding the central connector and the outer impact walls surrounding one pair of opposing side connectors are elevated such that when the container is placed on a flat surface there is a gap between said fork straps and the surface and the perimeter fork straps that are parallel to the central fork straps that are elevated are similarly elevated.

26. The reusable container of claim 25 wherein each connector of said plurality of connectors further comprises a male latch portion comprising at least one spring member terminating in a ramped end portion and at least one male latching surface defined by the ramped end portion of the at least one spring member and a female latch portion comprising a housing, said housing defining a central opening for receiving said at least one spring member of the male latch portion and said housing defining a female latching surface around a periphery of said central opening wherein none of said plurality of connectors bear a vertical load from the weight of the base.

* * * * *